(12) United States Patent
Cuneo et al.

(10) Patent No.: US 8,825,700 B2
(45) Date of Patent: Sep. 2, 2014

(54) PAGING HIERARCHICAL DATA

(75) Inventors: Andrew R. Cuneo, Seattle, WA (US); Ben Worline, Duvall, WA (US); Eric M. Zenz, Seattle, WA (US); Sean Zhu, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 562 days.

(21) Appl. No.: 12/127,006

(22) Filed: May 26, 2008

(65) Prior Publication Data

US 2009/0292718 A1 Nov. 26, 2009

(51) Int. Cl.
*G06F 7/00* (2006.01)
*G06F 17/30* (2006.01)

(52) U.S. Cl.
USPC .......................................... 707/778; 707/829

(58) Field of Classification Search
None
See application file for complete search history.

(56) References Cited

U.S. PATENT DOCUMENTS

| | | | |
|---|---|---|---|
| 5,615,325 A * | 3/1997 | Peden ............................ | 715/854 |
| 5,696,927 A | 12/1997 | Macdonald et al. | |
| 5,724,577 A * | 3/1998 | Exley et al. ............................ | 1/1 |
| 5,974,407 A | 10/1999 | Sacks | |
| 6,028,602 A * | 2/2000 | Weidenfeller et al. ......... | 715/781 |
| 6,356,920 B1 * | 3/2002 | Vandersluis ................... | 715/210 |
| 6,559,871 B1 * | 5/2003 | Brozowski et al. ............ | 715/853 |
| 6,711,715 B1 * | 3/2004 | Grealish ........................ | 715/206 |
| 6,898,593 B1 | 5/2005 | Mulukutla et al. | |
| 7,165,073 B2 | 1/2007 | Vandersluis | |
| 7,246,128 B2 | 7/2007 | Jordahl | |
| 7,277,885 B2 | 10/2007 | Eppley et al. | |
| 7,289,990 B2 | 10/2007 | Gupta | |
| 7,640,497 B1 * | 12/2009 | Black ............................. | 715/249 |
| 2002/0030703 A1 * | 3/2002 | Robertson et al. ............. | 345/853 |
| 2002/0083073 A1 * | 6/2002 | Vaidya et al. .................. | 707/102 |
| 2002/0120633 A1 * | 8/2002 | Stead .......................... | 707/104.1 |
| 2003/0063134 A1 * | 4/2003 | Lord et al. ...................... | 345/853 |
| 2004/0139080 A1 * | 7/2004 | Schmidt et al. ................ | 707/100 |
| 2005/0050477 A1 * | 3/2005 | Robertson et al. ............. | 715/853 |
| 2005/0060647 A1 * | 3/2005 | Doan et al. ..................... | 715/514 |
| 2005/0080757 A1 * | 4/2005 | Sharma et al. ..................... | 707/1 |
| 2005/0182775 A1 * | 8/2005 | Fitzgerald et al. ............. | 707/100 |
| 2005/0256893 A1 * | 11/2005 | Perry ............................. | 707/101 |
| 2006/0015490 A1 * | 1/2006 | Denuit et al. ..................... | 707/4 |
| 2006/0085440 A1 * | 4/2006 | Jandhyala et al. ............. | 707/100 |
| 2006/0085765 A1 * | 4/2006 | Peterson et al. ............... | 715/853 |

(Continued)

FOREIGN PATENT DOCUMENTS

| EP | 1435507 A2 * | 7/2004 |
|---|---|---|
| RU | 2313824 C2 | 12/2007 |
| WO | WO 2007137875 A1 * | 12/2007 |

OTHER PUBLICATIONS

Multi-user view-dependent rendering, Jihad El-Sana, IEEE 2000, pp. 335-342.*

(Continued)

*Primary Examiner* — Augustine K Obisesan
(74) *Attorney, Agent, or Firm* — Thomas Wong; David Andrews; Micky Minhas

(57) ABSTRACT

Architecture that provides the ability to intelligently page (slice) hierarchical datasets through viewing operations of a hierarchical view. This further provides the capability to make additions to/deletions from the hierarchy view and manage the parent/child relationship of view records without ever sending the entire recordset to the client or receiving the entire recordset back to the server, thereby optimizing operation performance on the hierarchical datasets.

20 Claims, 8 Drawing Sheets

(56) References Cited

U.S. PATENT DOCUMENTS

| | | |
|---|---|---|
| 2006/0235857 A1 | 10/2006 | Sauls et al. |
| 2007/0073734 A1* | 3/2007 | Doan et al. ............... 707/100 |
| 2007/0106853 A1 | 5/2007 | Evanchik et al. |
| 2007/0226187 A1 | 9/2007 | Beatty et al. |
| 2007/0294496 A1* | 12/2007 | Goss et al. ............... 711/163 |
| 2008/0250318 A1* | 10/2008 | Walter ..................... 715/713 |
| 2009/0024590 A1* | 1/2009 | Sturge et al. ............... 707/3 |

OTHER PUBLICATIONS

View Maintainance for hierarchical semi-structure data, Liefe et al, DaWak 2000, LNCS 1874, pp. 114-123, 2000.*

International Search Report, mailed Nov. 26, 2009, 11 pages.

"RadGrid for ASP.NET", 2002-2007, Telerik.

"Janus Web GridEX for .NET—ASP.NET—V1.0", 1996-2007, ComponentSource.

Davis, et al., "Intent, Perception, and Out-of-Core Visualization Applied to Terrain", IEEE Visualization 98 (Vis'98), 1998, IEEE.

"Third Office Action in China Patent Application No. 200980119899.6", Mailed Date: Oct. 15, 2013, Filed Date: Apr. 13, 2009, 6 Pages.

Notice of Allowance Received in Russian Federation Patent Application No. 2010148134, Mailed Date: Sep. 13, 2013, Filed Date: Apr. 13, 2009, 16 pages.

Notice of Allowance Received in China Patent Application No. 200980119899.6, Mailed Date: Mar. 11, 2014, Filed Date: Apr. 13, 2009, 4 Pages.

Office Action Received for Australian Patent Application No. 2009258015, Mailed Date: Mar. 25, 2014, Filed Date: Apr. 13, 2009, 3 Pages.

* cited by examiner

PAGING HIERARCHICAL DATA

BACKGROUND

The ubiquitous nature of networks and data systems facilitates the widespread access to large amounts of data. Enterprises, for example, now support distributed as well as local data systems that store all kinds of data related to, for example, financials, sales, products, project management, human resources, and so on. Thus, the ability of a user to access data from the server systems can impact performance of servers, networks, and client systems.

Conventional data systems typically involve the query and retrieval of large datasets. It is difficult to support interactive viewing and editing of large, hierarchical datasets in a client/server system in a way that promotes a positive user experience. Sorting, grouping, and other view operations that require the whole dataset are very resource intensive and scale poorly on the server as the number of users increases. Moreover, as records are added into levels of the hierarchy, these records also need to be accounted for in the above operations. When these constraints are coupled with the added complexity of a hierarchical dataset (e.g., a project that contains multiple levels of tasks), the complexity of the problem increases and performance on the client and/or server suffers.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture optimizes the performance of operations on hierarchical datasets in a client/server environment by minimizing the amount of data sent between the client and the server when reading or editing hierarchical datasets. The architecture facilitates the ability to intelligently page hierarchical datasets through viewing operations (e.g., sort, filter, grouping), the ability to make additions to/deletions from the hierarchy, and manage the parent/child relationship of dataset records without sending an entire recordset to the client or back to the server. The control can be optimized for read operations, but minimizes data transacted during edit operations as well.

To the accomplishment of the foregoing and related ends, certain illustrative aspects are described herein in connection with the following description and the annexed drawings. These aspects are indicative of the various ways in which the principles disclosed herein can be practiced, all aspects and equivalents of which are intended to be within the scope of the claimed subject matter. Other advantages and novel features will become apparent from the following detailed description when considered in conjunction with the drawings.

DETAILED DESCRIPTION

Figure 1:
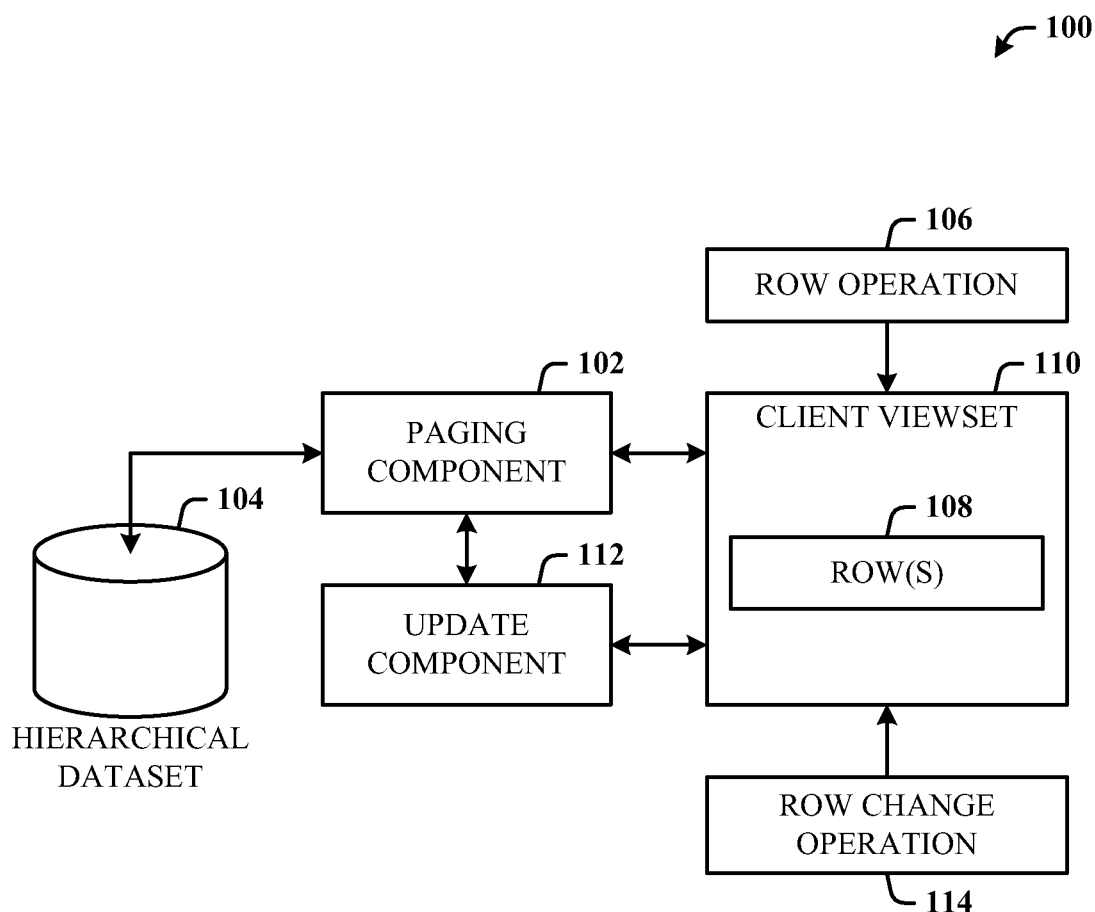
FIG. 1 illustrates a computer-implemented data processing system in accordance with the disclosed architecture.

The disclosed architecture is a client-server implementation that provides the ability to intelligently page (slice) hierarchical datasets through viewing operations of a hierarchical view on a client. This further provides the capability to make additions to/deletions from the hierarchy view on the client and manage the parent/child relationship of view records without ever sending the entire recordset to the client or receiving the entire recordset back to the server, thereby optimizing operation performance on the hierarchical datasets. The architecture maximizes the amount of data that can be paged and minimizes the data cannot be paged.

The following terminology related to "view" is used throughout the description. A dataset view is a subset of a larger dataset defined by a subset of fields, a subset of rows, row filter criteria, group criteria, sort criteria; the dataset view exists only on the server. A row view is exactly the subset of rows mentioned in dataset view. This list of rows is the 'fully expanded' list referred to elsewhere. An index into this list is what is referred to as 'data position' elsewhere. The row view exists on the server and the client.

A client view is a subset of the row view that does not include the children of collapsed rows. An index into this list is what is referred to elsewhere as 'view position'. A client viewset is a subset of the client view, and is what the user can physically see on the client at a given moment. That is, if the client view contains 100 rows, and 30 of the rows have been downloaded to the client, but only the first 10 rows are visible on the screen without scrolling, then the client viewset has a size of 10.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented data processing system 100 in accordance with the disclosed architecture. The system 100 includes a paging component 102 for paging (obtaining a subset) a hierarchical dataset 104 based on a row operation 106 on one or more rows 108 in a hierarchical client viewset 110. The system 100 also includes an update component 112 for updating the hierarchical client viewset 110 according to a row change operation 114. The update to the client viewset 110 can be based on row keys of the row view, the row keys associated with the page of the hierarchical dataset 104. The paging component 102 can page the hierarchical dataset 104 asynchronously based on the row change operation 114.

Note that the row change operation 114 is a row operation that is of an editing nature with respect to the hierarchy present in the dataset view 206. The row change operation 114 is the insertion of a row, the deletion of a row, or the indent or outdent of a row. A row change operation 114 may result in a subsequent row operation 106 if it becomes necessary to update the client viewset 110 with rows that have scrolled into view as the result of a row delete, for example.

The system 100 minimizes the amount of data handled by processing only relevant rows in the row view rather than recomputing the whole row view. To that end, the row operation 106 can be a read operation that collapses descendant rows of the hierarchical client viewset 110 into a collapsed row, expands a collapsed row to show one or more new descendant rows in the hierarchical client viewset 110, and adds or removes rows based on scrolling of the hierarchical client viewset 110. Read operations can be performed during a read mode where the hierarchical data is sent to a client for reading only. No edits are permitted in this mode, and for this reason, the grid can be more economical about the volume of unpaged data (e.g., the unfiltered hierarchy) the grid sends to the client. The grid is a computing framework for the exposing of large amounts of data of local and/or distributed data systems.

The scrolling can result in rows being appended to the client viewset 110 or removed from the client viewset 110. For example, when scrolling up, rows will be added to the top and removed from the bottom of the client viewset 110. The addition of the rows on the top of the client viewset 110 results in new queries (or requests) being sent to the paging component 102 for paging the dataset 104 for the desired new rows.

The row operation can be an edit operation associated with insert of a row, delete of a row, indent of a row, and/or outdent of a row in the hierarchical client viewset 110. Edit operations can be performed while in an edit mode where the hierarchical data is sent to a client in a format that supports edit operations on rows. An indent is the act of increasing a row's outline level to make the row a child of another row. Outdent is the act of decreasing a row's outline level to make the row a peer of its parent row.

The paging component 102 pages the hierarchical dataset 104 for rows relevant to the row operation based on filtering, sorting, row expansion, and row collapse for example.

Figure 2:
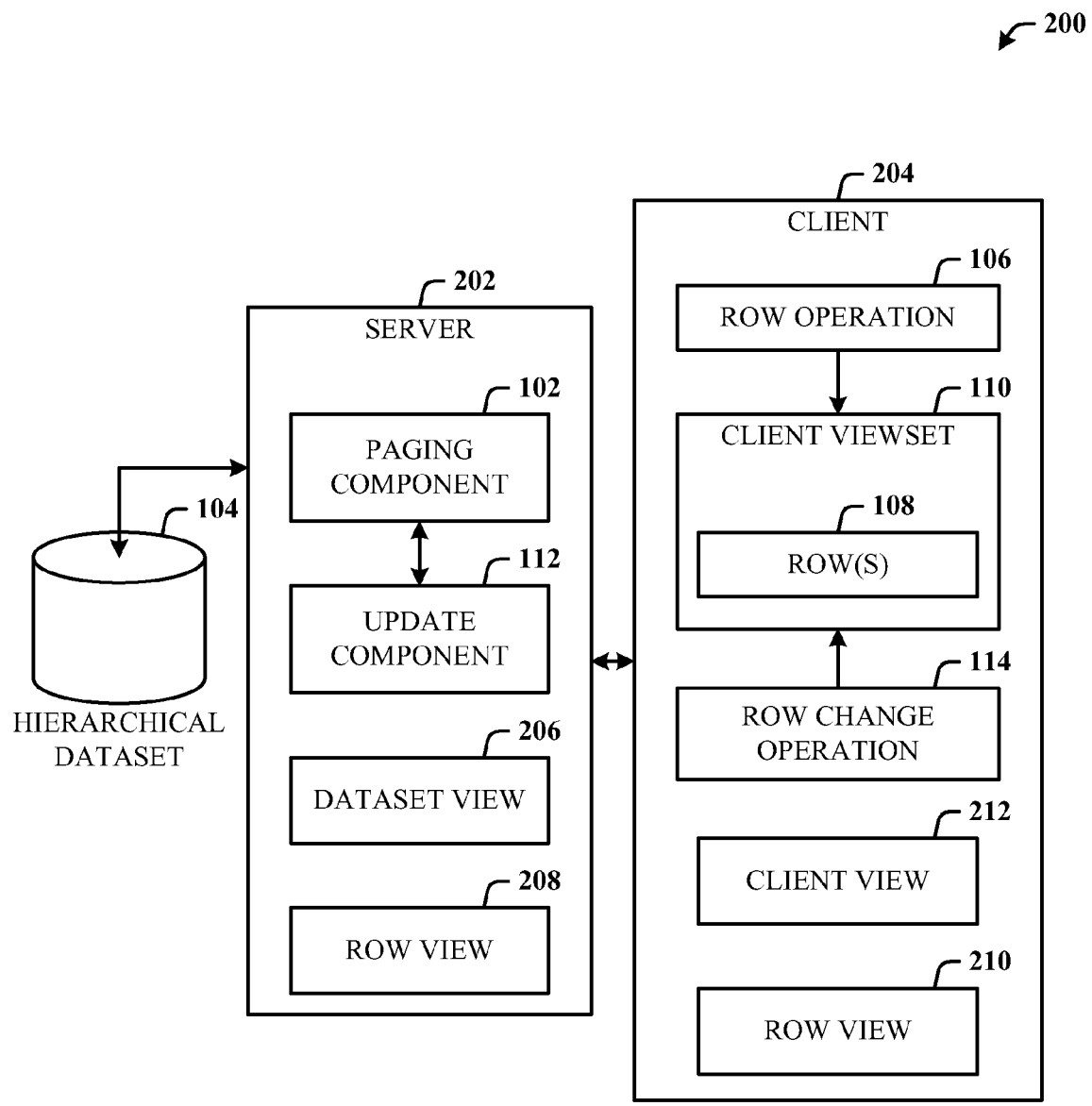
FIG. 2 illustrates a client-server system for paging hierarchical data.

FIG. 2 illustrates a client-server system 200 for paging hierarchical data. The system 200 embodies the paging component 102 and the update component 112 as part of a server system 202 for paging the hierarchical dataset 104 of the server system, and the hierarchical client viewset 110, view row(s) 108 row operation 106 and row change operation 114 as occurring on a client 204. The update component 112 updates an unfiltered hierarchy based on row operations associated with an edit mode.

The system 200 further illustrates the data generated and stored on each of the client 204 and the server 202. The paging component 102 generates the dataset view 206 and the server-side row view 208. A copy of the row view 208 is then sent to the client 204 as the client-side row view 210 to minimize the amount of data that would otherwise need to be sent between the server 202 and the client 204. A client view 212 can then be obtained from the client-side row view 210.

The paging component 102 manages a parent-child relationship of rows in the hierarchical client viewset 110 that are relevant to the row operation 106 and/or the row change operation 114. The paging component 102 also creates a hierarchy structure index (the server-side row view 208) defined by an ordered mapping of row keys and parent keys. The index is then sent to the client 204 based on the row operation (e.g., row operation 106, row change operation 114) of the hierarchical client viewset 110. These and other aspects will be described in greater detail herein below.

Figure 3:
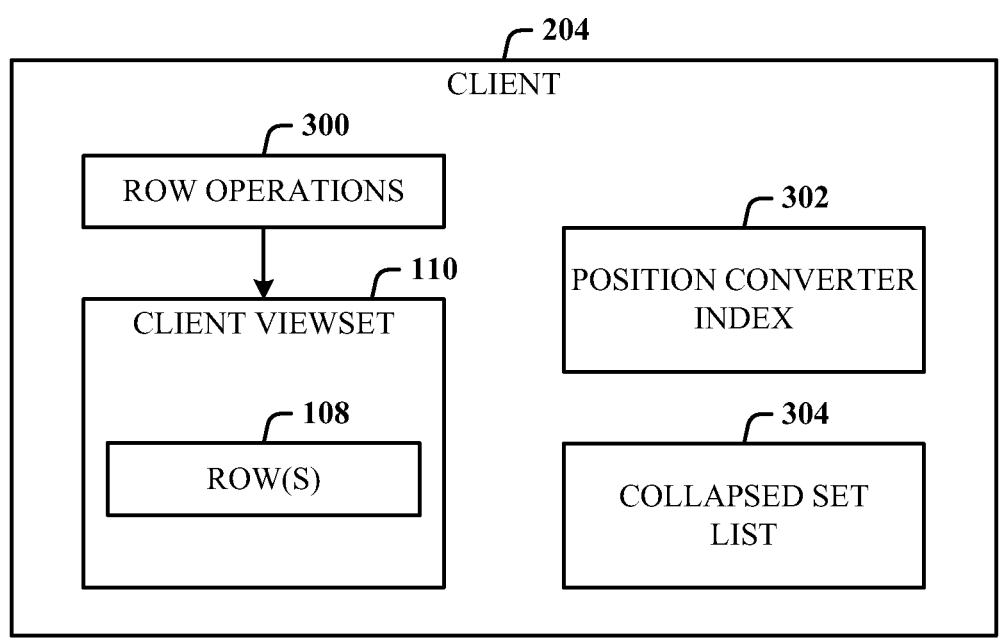
FIG. 3 illustrates a tracking mechanism employed on the client in cooperation with operations performed on the hierarchical view.

FIG. 3 illustrates a tracking mechanism employed on the client 204 in cooperation with operations performed on the hierarchical client viewset 110. Here, different types of row operations 300 (e.g., read-only, edit) can be performed on the row(s) 108 of the client viewset 110. In order to track row activity in the client-based client viewset 110, a position converter index 302 and collapsed set list 304 are employed. The position converter index 302 is an ordered index of the rows that is used to track the expanded/collapsed state of the hierarchy client viewset 110 and to translate between view position and data position. The view position is the ordinal position of a row within the client viewset 110 with respect to expanded/collapsed rows. The data position (also referred to as the row index) is the ordinal position of a row within the client viewset 110 that includes all rows, regardless of whether the rows are expanded or not. The collapsed set list 304 is a list of collapsed rows which allows the grid to know whether a row will be collapsed or expanded. The collapsed set list 304 is initially empty, but as rows are expanded/collapsed on the client 106, this list 304 is updated.

Figure 4:
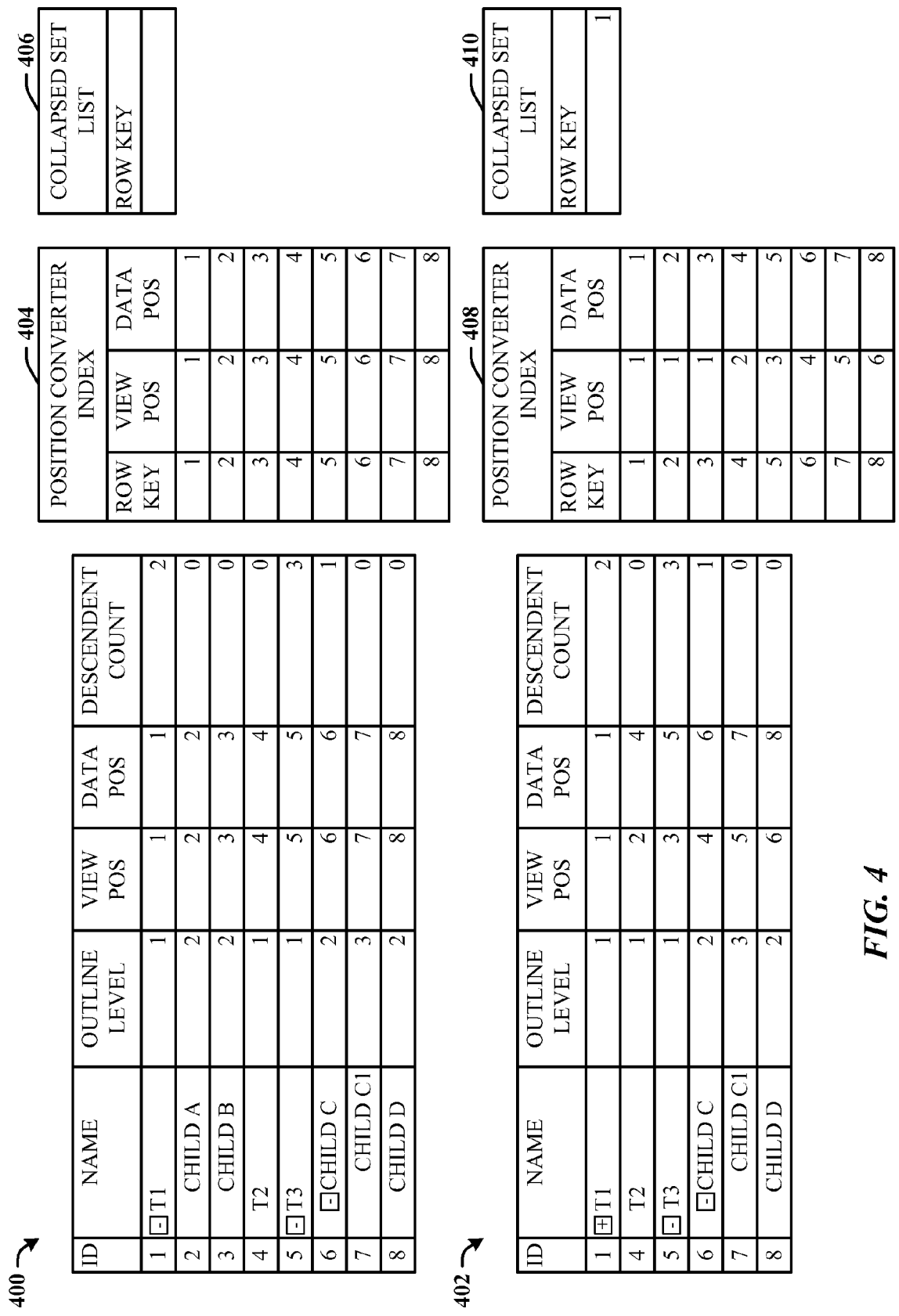
FIG. 4 illustrates an expanded view and collapsed view of rows and tracking information in the position converter index and collapsed set list.

FIG. 4 illustrates an expanded view 400 and collapsed view 402 of rows and tracking information in the position converter index and collapsed set list. The architecture minimizes the amount of data that is sent between the client and the server when reading or editing hierarchical datasets. The illustrated example describes read operations; however, data transacted during edit operations can be minimized as well. Both the read and edit operations begin with a client request to the server for data to be rendered in a grid. The server queries its database and applies one or more of sorting, filtering, or grouping defined by the client to produce a collection of rows. That collection of rows is then processed to generate datasets to send to the client.

An unfiltered hierarchy is a complete hierarchy structure that serves as a mapping of row keys and parent keys, in order. To understand what is meant by the qualifier 'unfiltered', consider an example of 3 rows, A, B and C. B is a child of A, and C is a child of B. It could be that in the course of row filtering, B is not included in the row view, and thus, C has no parent (immediate ancestor) in the row view. The unfiltered hierarchy is the hierarchical relationship between A, B and C. There is no need to determine C's parent when scrolling/expanding/collapsing, but this is needed when indenting/outdenting/inserting/deleting. Thus, during edit operations, the unfiltered hierarchy is used since the desired information cannot be constructed from examining each row view record's parent identifier.

The unfiltered hierarchy structure is only sent to the client during editing, and is used to answer questions about rows as needed on the client including a row's outline level, whether the row is a parent, which rows are child rows, and which row is this row's previous sibling, to support indent/outdent. In edit mode, the hierarchy structure is sent to the client without paging. The whole hierarchy structure is surfaced to support operations that affect the hierarchy (e.g., indent/outdent, inserting, or deleting rows).

Rows are a paged set of row keys and associated data (in the case of projects, this can be a collection of tasks by ID). As is described below, this includes the following fields. Outline level: in read-only mode, this field alone mitigates the need to have the unfiltered hierarchy structure; in edit mode, the system uses the unfiltered hierarchy. A parent row key: in read-only mode, this field alone mitigates the need to have the unfiltered hierarchy; in edit mode, the system uses the unfiltered hierarchy structure. Descendent count: in read-only mode, this is computed on the server and sent to the client; in edit mode, the unfiltered hierarchy structure and the row view are used to compute the descendent count. Other data fields can also be employed as deemed useful to the system.

Note that the entire hierarchical dataset is not included in the list above. The total list of rows is not sent to the client. Only the relevant rows required in the client viewset with respect to filtering, sorting, and expanded/collapsed hierarchy are sent to the client.

As shown, the expanded view 400 includes columns for an identifier (ID), Name, Outline Level, View Position, Data Position, and Descendant Count. The descendent count is the total number of child rows that are visible with respect to the current row view. In other words, after a filter, this is the count of child, grandchild, etc., rows that can possibly be sent to the client. A summary row is a row in the hierarchy that has children. In the expanded view 400, T1 is a summary row because it has child rows (CHILD A and CHILD B). It is to be understood that view 400 and view 402 are both client views, just before and after snapshots in an example of collapsing a single row. It can be coincidental that view 400 includes the exact set of rows that the row view includes.

As previously indicated, the view position (VIEW POS) is the ordinal position of a row within the current expanded view 400 with respect to expanded/collapsed rows, and the data position (DATA POS) is the ordinal position of a row within the current view 400 that includes all rows, regardless of whether the rows are expanded or not. The outline level is defined according to level (e.g., 1, 2, 3, . . . ). Here, the TI name is the leftmost outline level of 1, CHILD A is designated as an outline level 2, CHILD C1 is further indented to an outline level of 3, and so on. There are eight rows in the expanded view 400; thus, the view position numbers 1-8 are assigned to corresponding IDs 1-8. The data position number is assigned to the row and follows the row whether expended or collapsed. Note how collapsing T1 caused the view positions to change, but the data position for the rows remain unchanged.

The descendant count for row ID 1 is two due to the row ID 1 having two child rows (ID 2 and ID 3). The child rows (ID 2 and ID 3) do not have child rows; thus, the descendent count is zero for each of these rows (ID 2 and ID 3).

The position converter index 404 and the collapsed set list 406 are maintained on the client for efficiency. The position converter index 404 is an ordered index of the rows that is used to track the expanded/collapsed state of the hierarchy and to translate between view position and data position. The position converter index 404 includes a row key field which is a GUID (globally unique ID) that identifies the row in the database, a view position field which is the position of this row from the top of the view with respect to any expanded/collapsed rows, and a data position which is the absolute position of this row from the top of the view (ignoring collapsed rows). The position converter index 404 allows a for quick conversion between view position and data position so that only the rows that are in client viewset are retrieved from the server, and that the rows are placed in the right visual order. This data structure is created at runtime on the client and added-to when rows are collapsed. The initial state of this table is that of no rows, since the hierarchy is expanded by default.

The collapsed set list 406 is the list of collapsed rows which allows the grid to know whether a row will be collapsed or expanded. This list 406 is initially empty, but as rows are expanded/collapsed on the client, this list is updated.

In this example, the corresponding values in the position converter index 404 and the collapsed set list 406 track the expanded view 400 such that the row keys (IDs) are 1-8, the view position is 1-8, and the data position is 1-8. Since there are no collapsed rows in the expanded (fully) view 400, the collapsed set list is empty.

Continuing with the collapsed view 402, row ID 1 is now collapsed (as indicated by the "+" symbol). The corresponding values in the position converter index 408 and the collapsed set list 410 track the collapsed view 402. The collapse of the child rows (ID 2 and ID 3) result in converter values of the row keys (IDs) as 1-8, the view position as mapping the row key IDs 2 and 3 to the row ID 1 in which the child rows collapse and also mapping the other view positions for the remaining row key IDs to the current view position. The data position is as before 1-8. Since there are now collapsed rows in the view 402, the collapsed set list 410 enumerates the row ID 1 as the collapsed row.

Some or all of these collections are sent to the client. In read mode, the row view and/or paged subset of rows including three extra fields to define its hierarchical relationship to other rows can be sent. In edit mode, the unfiltered hierarchy structure, the row view, and/or paged subset of rows (not including three extra fields to define its hierarchical relationship to other rows—since the information these fields provide can be derived from the unfiltered hierarchy structure).

The client can then decide which rows to request from the server to fill the client viewset in the following read mode and edit mode events. In read mode and related to collapse, the collapsed set is updated to include the indicated row key, and then the position converter is updated to include new view positions. In read mode and related to expansion, the expanded row is removed from the collapsed set, followed by the position converter updating to include new view positions. The client then requests rows that the client does not already have from the client viewset. When a node is collapsed, and the node includes one or more collapsed children, those list entries in the collapsed set are appended to the entry of the newly collapsed row in the collapsed set. In read mode and related to scrolling (down/up), the grid uses the requested position in the client viewset to request a paged set of rows from the client.

In edit mode and related to insert, the unfiltered hierarchy is updated to include a new row at the indicated position, giving that new row the proper parent ID and order within its siblings. The position converter is updated, and all subsequent view positions are incremented by one. The grid then saves the change to the server. The server does not need to send down an unfiltered hierarchy update because the client version matches what the server maintains as the unfiltered hierarchy, including the addition.

In edit mode and related to delete, the unfiltered hierarchy is updated to remove the indicated row. The position converter is updated, and all subsequent view positions are decremented by one. As above, the unfiltered hierarchy structure on the client is correct. In edit mode and related to indent, since the unfiltered hierarchy structure is a tree, the grid looks up the indicated row and moves the row to the correct location in the tree. The view position does not change, so there is no need to update the position converter. Note that the descendent count is evaluated on an as-needed basis; the grid asks the row to count its children and then caches the data so that next time the information is required, the lookup is readily available. In edit mode and related to outdent, since the unfiltered hierarchy structure is a tree, the grid looks up the indicated row and moves the row to the correct location in the tree.

Grouping is a special case of hierarchy. To group, the server sorts all the data, generates an artificial hierarchy, and inserts fictitious summary rows for grouping headers. The new row view is sent to the client as any other view. In a grouped view, the outline level is equivalent to the count of grouping clauses.

Following is a series of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
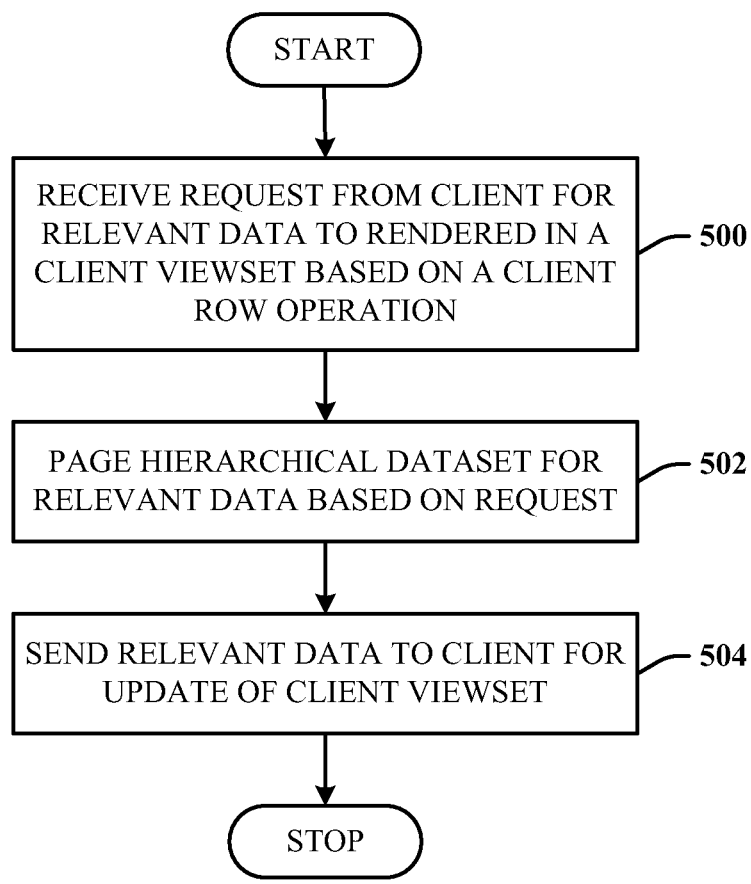
FIG. 5 illustrates a method of processing data.

FIG. 5 illustrates a method of processing data. At 500, a request is received from a client for relevant data to be rendered in hierarchical client viewset based on a client row operation. At 502, a hierarchical dataset is paged for the relevant data based on the request. At 504, the relevant data is sent to the client for update of the hierarchical client viewset. The hierarchical dataset can be paged asynchronously based on the request.

Moreover, the method can further comprise managing the parent-child relationships based on the row operation. The paging of the hierarchical dataset can be in response to a read operation that collapses rows of the hierarchical client viewset into a collapsed row, expands a collapsed row to show one or more new rows in the hierarchical client viewset, and adds or removes rows based on scrolling of the hierarchical client viewset. Alternatively, the paging of the hierarchical dataset can be in response to an edit operation associated with insert of a row, delete of a row, indent of a row, or outdent of a row in the hierarchical row view.

The method can comprise creating an unfiltered hierarchy structure that defines the relevant data related to row parentage, row outline level, child rows, and indent/outdent operations, but also applying one or more of filtering, sorting, or grouping to receive the relevant data.

Figure 6:
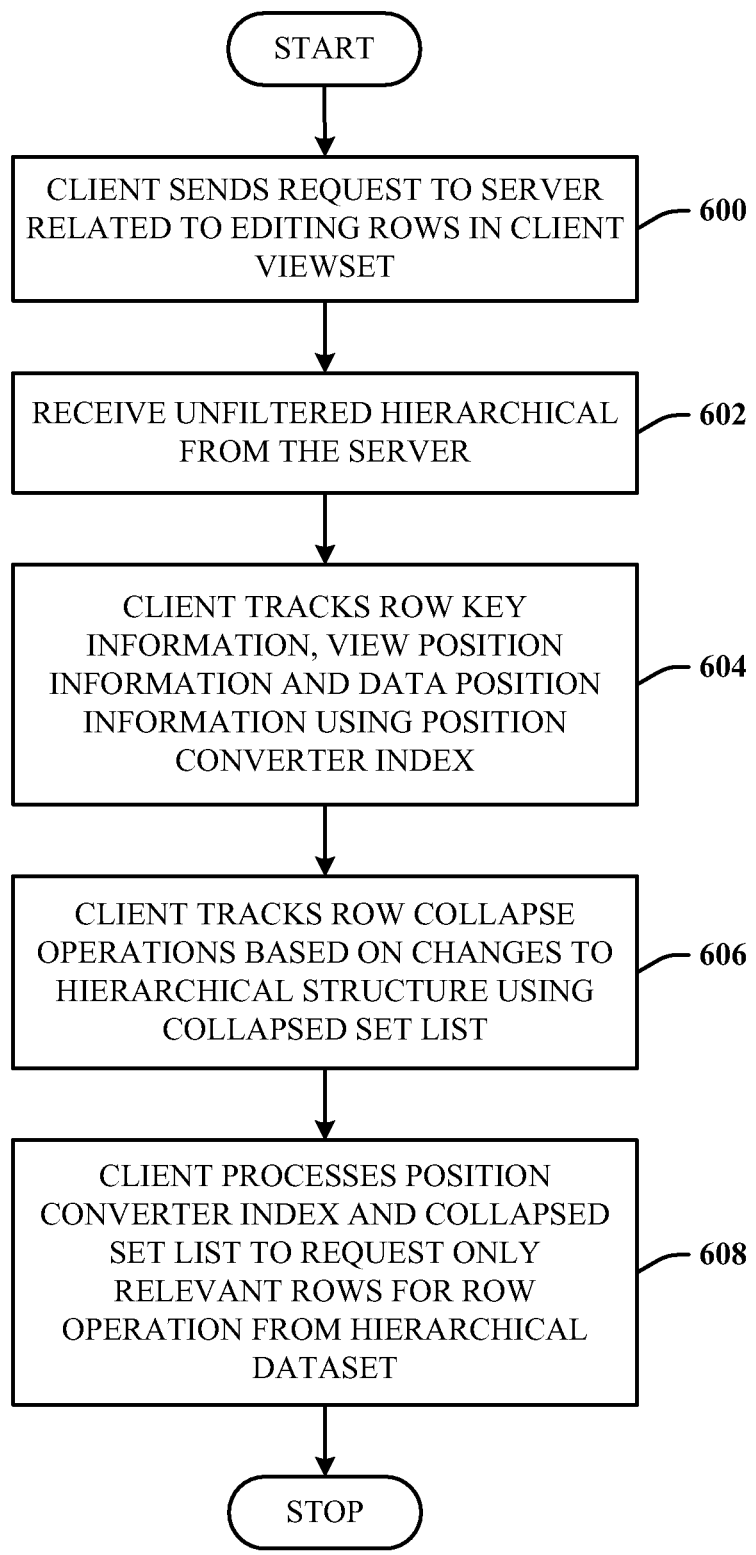
FIG. 6 illustrates a method of tracking client-side view operations.

FIG. 6 illustrates a method of tracking client-side view operations. At 600, the client sends a request to a server related to editing of rows in a hierarchical client viewset. At 602, an unfiltered hierarchy structure is received from the server. At 604, the client tracks row key information, view position information, and data position information based on changes to the hierarchical structure using a position converter index. At 606, the client tracks row collapse operations based on changes to the hierarchical structure using a collapsed set list. At 608, the client processes the position converter index and the collapsed set list to request only the relevant rows for a row operation from the hierarchical dataset.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 7:
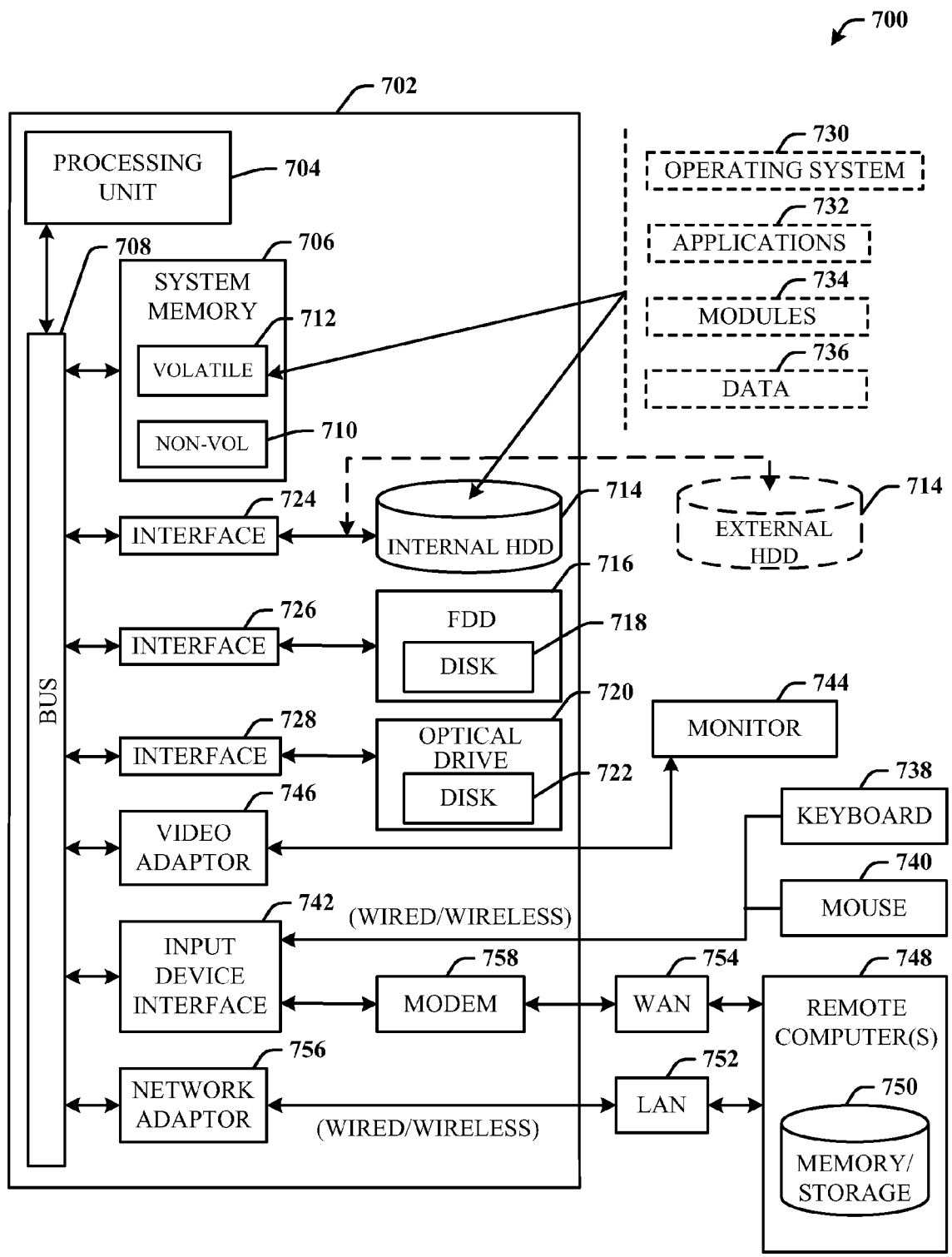
FIG. 7 illustrates a block diagram of a computing system operable to execute paging and view processes in accordance with the disclosed architecture.

Referring now to FIG. 7, there is illustrated a block diagram of a computing system 700 operable to execute paging and view processes in accordance with the disclosed architecture. In order to provide additional context for various aspects thereof, FIG. 7 and the following discussion are intended to provide a brief, general description of a suitable computing system 700 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 7, the exemplary computing system 700 for implementing various aspects includes a computer 702 having a processing unit 704, a system memory 706 and a system bus 708. The system bus 708 provides an interface for system components including, but not limited to, the system memory 706 to the processing unit 704. The processing unit 704 can be any of various commercially available processors. Dual microprocessors and other multi-processor architectures may also be employed as the processing unit 704.

The system bus 708 can be any of several types of bus structure that may further interconnect to a memory bus (with or without a memory controller), a peripheral bus, and a local bus using any of a variety of commercially available bus architectures. The system memory 706 can include non-volatile memory (NON-VOL) 710 and/or volatile memory 712 (e.g., random access memory (RAM)). A basic input/output system (BIOS) can be stored in the non-volatile memory 710 (e.g., ROM, EPROM, EEPROM, etc.), which BIOS are the basic routines that help to transfer information between elements within the computer 702, such as during start-up. The volatile memory 712 can also include a high-speed RAM such as static RAM for caching data.

The computer 702 further includes an internal hard disk drive (HDD) 714 (e.g., EIDE, SATA), which internal HDD 714 may also be configured for external use in a suitable chassis, a magnetic floppy disk drive (FDD) 716, (e.g., to read from or write to a removable diskette 718) and an optical disk drive 720, (e.g., reading a CD-ROM disk 722 or, to read from or write to other high capacity optical media such as a DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide nonvolatile storage of data, data structures, computer-executable instructions, and so forth. For the computer 702, the drives and media accommodate the storage of any data in a suitable digital format. Although the description of computer-readable media above refers to a HDD, a removable magnetic diskette (e.g., FDD), and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and volatile memory 712, including an operating system 730, one or more application programs 732, other program modules 734, and program data 736. As a client computing system, the one or more application programs 732, other program modules 734, and program data 736 can include the hierarchical client viewset 110, rows 108, row operation 106, row change operation 114, the client 204, row view 210, client view 212, row operations 300, position converter index 302, collapsed set list 304, expanded view 400, collapsed view 402, position converter indexes (404 and 408), collapsed set lists (406 and 410), and the method of FIG. 6, for example. Where the computer 702 is employed as a server system, the one or more application programs 732, other program modules 734, and program data 736 can include the paging component 102, update component 112, hierarchical dataset 104, server 202, dataset view 206, row view 208, and method of FIG. 5, for example.

All or portions of the operating system, applications, modules, and/or data can also be cached in the volatile memory 712. It is to be appreciated that the disclosed architecture can be implemented with various commercially available operating systems or combinations of operating systems.

A user can enter commands and information into the computer 702 through one or more wire/wireless input devices, for example, a keyboard 738 and a pointing device, such as a mouse 740. Other input devices (not shown) may include a microphone, an IR remote control, a joystick, a game pad, a stylus pen, touch screen, or the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, etc.

A monitor 744 or other type of display device is also connected to the system bus 708 via an interface, such as a video adaptor 746. In addition to the monitor 744, a computer typically includes other peripheral output devices (not shown), such as speakers, printers, etc.

The computer 702 may operate in a networked environment using logical connections via wire and/or wireless communications to one or more remote computers, such as a remote computer(s) 748. The remote computer(s) 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, is connected to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 8:
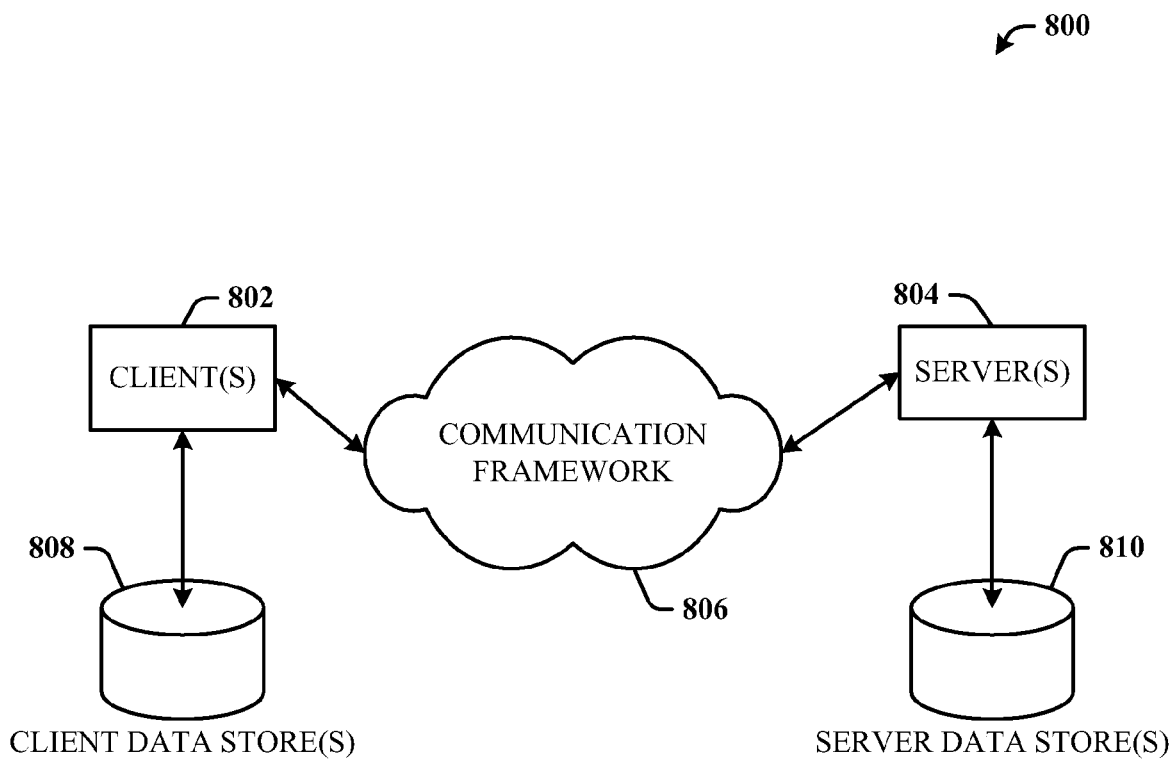
FIG. 8 illustrates a schematic block diagram of an exemplary computing environment for executing paging and view processes.

Referring now to FIG. 8, there is illustrated a schematic block diagram of an exemplary computing environment 800 for executing paging and view processes. The environment 800 includes one or more client(s) 802. The client(s) 802 can be hardware and/or software (e.g., threads, processes, computing devices). The client(s) 802 can house cookie(s) and/or associated contextual information, for example.

The environment 800 also includes one or more server(s) 804. The server(s) 804 can also be hardware and/or software (e.g., threads, processes, computing devices). The servers 804 can house threads to perform transformations by employing the architecture, for example. One possible communication between a client 802 and a server 804 can be in the form of a data packet adapted to be transmitted between two or more computer processes. The data packet may include a cookie and/or associated contextual information, for example. The environment 800 includes a communication framework 806 (e.g., a global communication network such as the Internet) that can be employed to facilitate communications between the client(s) 802 and the server(s) 804.

Communications can be facilitated via a wire (including optical fiber) and/or wireless technology. The client(s) 802 are operatively connected to one or more client data store(s) 808 that can be employed to store information local to the client(s) 802 (e.g., cookie(s) and/or associated contextual information). Similarly, the server(s) 804 are operatively connected to one or more server data store(s) 810 that can be employed to store information local to the servers 804.

The client(s) 802 can include the client 204 and method of FIG. 6, and the server(s) can include the server 202 and method of FIG. 5.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented data processing system, comprising:
    a table comprising rows, and columns that indicate an identifier, name, outline level, view position, data position, and descendant count, the table in part defines a hierarchical dataset of an entire recordset;
    a position converter index comprising an ordered index of the rows used to track an expanded/collapsed state of the table and to translate between a view position and a data position of the hierarchical dataset;
    a collapsed set list comprising a list of collapsed rows, configured to indicate whether a respective row of the hierarchical dataset is to be collapsed or expanded;
    a paging component configured to page the table, the position converter, and the set list to obtain relevant rows to a row operation on one or more rows of a client viewset, thereby reducing an amount of processed data to the relevant rows, wherein paging comprises obtaining a subset of rows through viewing operations including sorting, filtering, or grouping, and wherein the client viewset represents what a user can physically see on a client at a given moment;
    an update component configured to update the client viewset to include the relevant rows in response to a row change operation comprising a row operation of an editing nature, the update to the client viewset based on row keys associated with the paged table; and
    a processor that executes computer-executable instructions associated with at least one of the table, the position converter index, the collapsed set list, the paging component, or the update component.

2. The system of claim 1, wherein the paging component manages a parent-child relationship of rows in the client viewset, the rows are relevant to the row operation.

3. The system of claim 1, wherein the paging component creates a hierarchy structure index defined by an ordered mapping of row keys and parent keys, the index sent to a client in response to the row operation of the client viewset.

4. The system of claim 1, wherein the row operation is a read operation that collapses rows of the hierarchical view into a collapsed row, expands a collapsed row to show one or more new rows in the hierarchical view, and adds or removes rows based on scrolling of the client viewset.

5. The system of claim 1, wherein the row operation is an edit operation associated with insert of a row, delete of a row, indent of a row, or outdent of a row in the client viewset.

6. The system of claim 1, wherein the paging component pages the hierarchical dataset for rows relevant to the row operation based on filtering, sorting, row expansion, and row collapse.

7. The system of claim 1, wherein the update component updates an unfiltered hierarchy based on row operations associated with an edit mode.

8. The system of claim 1, wherein the paging component pages the hierarchical dataset asynchronously based on the row change operation.

9. A computer-readable storage memory comprising computer-executable instructions that when executed by a processor enables a data processing system, comprising:
    a table comprising rows, and columns that indicate an identifier, name, outline level, view position, data position, and descendant count;
    datasets associated with the table, the datasets comprising a position converter index and a collapsed set list, wherein the position converter index is an ordered index of the rows that is used to track an expanded/collapsed state of the table and to translate between a view position and a data position, and wherein the collapsed set list is a list of collapsed rows, to indicate whether a respective row will be collapsed or expanded;
    a paging component of a server configured to obtain a subset of relevant rows of the table in response to a row operation for obtaining relevant data to be rendered in a client viewset of a client, where the client viewset comprises a set of rows visible on a screen of the client without scrolling; and
    an update component of the server configured to update the client viewset to include the relevant rows according to a row change operation comprising a row operation of an editing nature, the subset including only rows relevant to the row change operation.

10. The computer-readable storage memory of claim 9, wherein the paging component manages parent-child relationships of rows in the client viewset.

11. The computer-readable storage memory of claim 9, wherein the paging component creates a hierarchy structure index defined by an ordered mapping of row keys and parent keys, and sends the index to a client with the updated client viewset based on an editing row operation.

12. The computer-readable storage memory of claim 9, wherein the row operation is a read operation, the read operation associated with collapsing rows of the client viewset into a collapsed row, expanding a row to show one or more new rows in the client viewset, or adding and removing rows based on scrolling of the client viewset.

13. The computer-readable storage memory of claim 9, wherein the row operation is an edit operation associated with insert of a row, delete of a row, indent of a row, or outdent of a row in the client viewset.

14. A computer-implemented method of processing data, comprising acts of:
- providing a table that defines a hierarchical dataset of an entire recordset, the table comprising rows, and columns that indicate an identifier, name, outline level, view position, data position, and descendant count of the hierarchical dataset;
- providing datasets associated with the table, the datasets comprising a position converter index and a collapsed set list, wherein the position converter index is an ordered index of the rows that is used to track an expanded/collapsed state of the table and to translate between a view position and a data position, and wherein the collapsed set list is a list of collapsed rows, to indicate whether a respective row is to be collapsed or expanded;
- receiving a request from a client for relevant data to be rendered in a client viewset based on a client row operation, where the client viewset comprises a set of rows visible on a screen of the client without scrolling;
- obtaining a subset of relevant rows of the table for the relevant data in response to the request by performing viewing operations including sorting, filtering, or grouping;
- sending the relevant rows to the client for update of the client viewset; and
- utilizing a processor that executes instructions stored in memory to perform at least one of the acts of receiving, obtaining, or sending.

15. The method of claim 14, further comprising managing parent-child relationships based on the row operation.

16. The method of claim 14, further comprising paging the table in response to a read operation that collapses rows of the client viewset into a collapsed row, expands a collapsed row to show one or more child rows in the client viewset, and shows/hides rows based on scrolling of the client viewset.

17. The method of claim 14, further comprising obtaining a subset of the hierarchical dataset as represented by the table and the datasets, in response to an edit operation associated with insert of a row, delete of a row, indent of a row, or outdent of a row in the client viewset.

18. The method of claim 14, further comprising applying one or more of filtering, sorting, or grouping to receive the relevant data.

19. The method of claim 14, further comprising creating an unfiltered hierarchy structure that defines the relevant data related to row parentage, row outline level, child rows, and indent/outdent operations.

20. The method of claim 14, wherein the subset of the hierarchical dataset as represented by the table is obtained asynchronously based on the request.

\* \* \* \* \*